Patented May 19, 1936

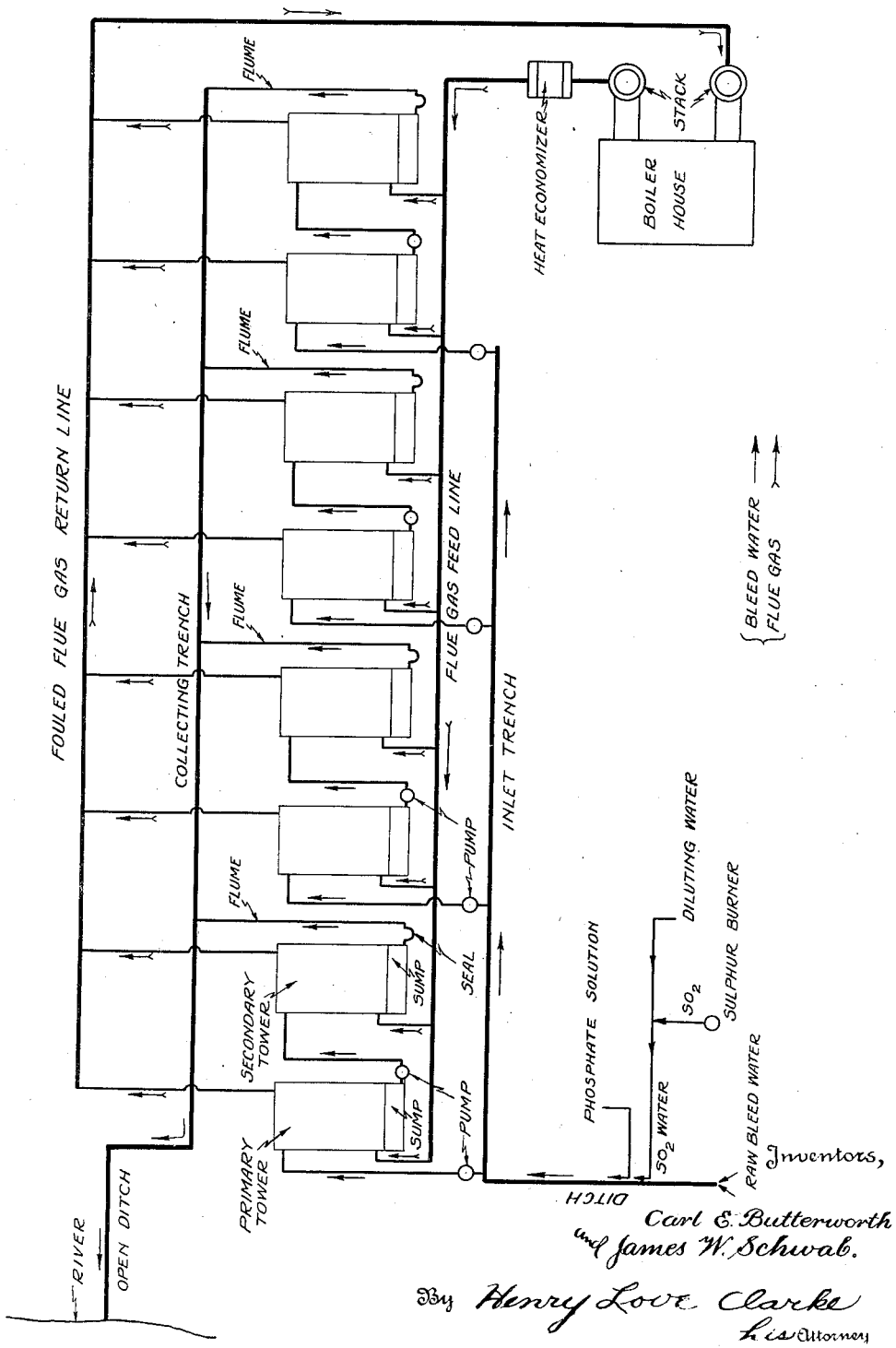

2,041,397

UNITED STATES PATENT OFFICE 2,041,397

TREATING SULPHUR-MINING BLEED-WATER

Carl E. Butterworth, New Gulf, and James W. Schwab, Gulf, Tex., assignors to The Koppers Company of Delaware, a corporation of Delaware Application September 25, 1934, Serial No. 745,489

10 Claims. (Cl. 210—16)

This invention relates in general to improvements in treating and purifying sulphur-mining bleed-water containing sulphur compounds, such as sulphides, hydrosulphides, polysulphides, and the like.

Objects of the invention are the provision of a process of purifying such bleed-water in which the presence of deposits of suspended matter, which tend to form by chemical reaction in the course of the process and accumulate in the water and clog the purification apparatus, is eliminated; the provision for improvements in such purification process whereby the presence of deposits of clogging suspended sulphur is eliminated; the provision of improvements for eliminating the presence of deposits of clogging suspended sulphur which are improvements that will not disadvantageously affect treatment for also eliminating deposits of calcium carbonate scale; and the invention has for further objects such other improvements and advantages as may be found to obtain in the process hereinafter described or claimed.

We have found the most successful processes for purifying the bleed-water to be those of passing a gas containing carbon dioxide, such as flue gas (stack gas) through the bleed-water to carbonate the liquid and also sweep the hydrogen sulphide, which is released by the chemical carbonation reaction with carbon dioxide, out of the bleed-water. Processes of this type are described in Patent 1,851,987 granted April 5, 1932, and in Patent 1,964,487 granted June 26, 1934.

In our treatment of the bleed-water by said processes calcium carbonate difficulty was prevented by supplying phosphate ions to the liquid as by adding a soluble phosphate or phosphoric acid thereto prior to treatment with the gas in the manner described in Judson Patent, 1,924,861 granted August 29, 1933. As a result of this treatment it was found that the presence of deposits on the tower packing was avoided, but after a considerable time we found that deposits of sulphur were occurring. This sulphur deposition did not show up until the phosphate treatment had stopped the formation of carbonate scale. A soft deposit appeared which on analysis apparently was for the most part sulphur. This soft deposit did not wash off the tower packing, but was getting thicker as more water was being treated. While the exact composition of the bleed-water is not known, it is known that the composition changes every time an old bleed well is discarded for a new one and that the chief sulphide compound in raw bleed-water is calcium hydrosulphide, Ca(HS)$_2$. This is one compound that the treatment with CO$_2$ is to decompose, releasing H$_2$S, which is then swept out of the solution by the sweeping action of the gas. In addition to the above compound there is also present in the raw bleed-water some calcium pentasulphide, CaS$_5$, which is of the class of compounds known as polysulphides. These polysulphides increase as mining operations continue. These compounds (polysulphides) all have a yellowish color when in solution and it is thought that the yellow color of this water was due to the presence in it of polysulphides. Indications were that the sulphur which is thrown down when the bleed-water is treated with flue gas is the sulphur present as such polysulphide since this may occur in the reaction of polysulphide with CO$_2$ as follows:

$$CaS_5 + 2CO_2 + 2H_2O = Ca(HCO_3)_2 + 4S + H_2S.$$

It will be noted that free sulphur is formed according to the above reaction. This sulphur, being insoluble, comes out as a fine precipitate and in the course of time gives the water a milky color. This sulphur probably gradually accumulates on the hurdles of the treatment towers, finally tending to fill up the free space and thereby rendering the towers ineffective for the contact function.

Further, the temperature of the flue gas when it reaches the treating towers may range from 90° to 260° F., which higher temperatures considerably heat the bleed-water under treatment especially at the bottom of the towers where the hot gas first comes in contact with the water. It is well known that heat has a tendency to decompose polysulphides, releasing free sulphur. Further, the temperature of the water changes considerably, from 95° to 120° F. in summer and from 80° to 110° F. in winter.

We have found by subjecting the bleed-water to a weak dosage with a soluble sulphite that we are able to eliminate the deposits of clogging suspended sulphur, and that after treatment with sulphurous acid or its compounds, such as sodium sulphite, sodium acid sulphite or weak sulphurous acid (made by dissolving SO$_2$ in water), the bleed-water loses its characteristic yellow color. This water when so treated and treated also with flue gas is fairly clear of suspended matter. Up until the present time not only has the deposition of sulphur been checked but it also appears that there has been some removal of old deposit in the treating towers.

It is well known that sulphur dioxide and hydrogen sulphide react in water to form elemental sulphur. In order to prevent this formation of a sulphur precipitate we find it necessary to use a weak dosage such as a weak solution. The quantity of SO₂ needed in actual practice may be judged by the degree to which the yellow color has been bleached after treatment with this reagent. There should be for best results sufficient SO₂ present to just remove the yellow color mentioned. The sulphur, which is present as hydrosulphide and which is present in greater quantity in the bleed-water, is believed to leave the bleed-water as hydrogen sulphide when aerated with flue gas. It is also thought that the presence of SO₂ in the bleed-water converts the yellow polysulphides into some soluble, colorless sulphur compound which undergoes little if any change in the presence of the flue gas which contains 7% to 9% carbon dioxide. The use of SO₂ in the treatment of the bleed-water has been in use by us for some time during which we have varied conditions considerably as to the chemical constitution of the bleed-water, the temperature of the bleed-water, and the temperature of the aeration gas, such as flue gas, used in the treatment.

The presence of the SO₂ in the bleed-water we find does not disadvantageously affect the phosphate ion treatment to eliminate the carbonate scale, and the elimination of sulphur deposition we find may be obtained without the phosphate treatment.

Frequent inspection of the tower packing reveals no heavy sulphur deposition and the presence of the SO₂ in the bleed-water does not affect the pH of the water. While we do not wish to state exactly that any particular chemical reaction takes place when the bleed-water is treated with sulphur dioxide and flue gas for our purpose, we do know that the bleed-water when treated with flue gas, without SO₂ present, contains considerable suspended sulphur and the hurdles we believe will in time be clogged or plugged with sulphur. The sulphur dioxide and phosphate treatment gives a fairly clear water in regard to suspended matter and there seems to be even after a very considerable time no accumulation of sulphur on the treating tower hurdles. This leads us to believe that the "poly" part of the sulphide causes the sulphur precipitation when no sulphur dioxide is used, and that apparently when sulphur dioxide is used a soluble sulphur compound is formed between the polysulphide and sulphite which does not decompose with liberation of free sulphur in the presence of the flue gas and its contained carbon dioxide.

To obtain these results the sulphur dioxide for the reaction may be introduced either by means of the aeration gas, such as flue gas, or the bleed-water, or directly and separately into the treating towers, or by any two or all of these measures. When aeration gas, flue gas, is used to introduce the sulphur dioxide to the bleed-water, the sulphur dioxide may be separately introduced into the gas or the same effect may be obtained by using oil for boiler fuel containing, for example, 1.0 to 1.5 per cent of sulphur. The flue gas from combustion of such an oil will contain SO₂ in about the right quantity when such flue gas is used for treating the bleed-water. We believe the result desired is better attained however, if the SO₂ for the treatment is introduced by the bleed-water itself and some time in advance of the passing of the bleed-water into the treating towers for treatment with the aeration (flue) gas.

Therefore, in our practice of the invention, we prefer the following procedure, illustrated diagrammatically in the accompanying drawing.

*Bleed-water flow.*—The bleed-water comes to the surface at a temperature of about 100° F. or higher from the various wells and is collected and passed through open ditches to a plant comprising four purification units each of which may be operated independently of the others, each unit having a daily capacity of about 2,500,000 gallons and comprising two towers filled with wooden hurdles. The mixed water from the various wells arrives at the plant containing 12–20 gr. per gallon of sulphide.

Dilute SO₂ water is run into the raw bleed-water about 50 feet from the end of the ditch, and about 100 to 200 feet ahead of the treating towers so that the dilute SO₂ water can thoroughly mix with the bleed-water in the ditch before entering the plant. To facilitate mixing, wooden baffles are built in the ditch between the place where the SO₂ water is added and the entrance of the plant (flue gas treating towers) so as to cause the mixture of bleed-water and dilute SO₂ water to take a zig-zag course of flow. As before stated, in the raw bleed-water the chief sulphide compound is calcium hydrosulphide, Ca(HS)₂. This is one compound that the treatment with CO₂ is to decompose releasing H₂S which is then swept out of the solution by the sweeping function of the gas. In addition, the bleed-water contains some calcium pentasulphide, CaS₅, which is of the class of compounds known as polysulphides.

When there is no pretreatment of the bleed-water with SO₂, the polysulphide is probably decomposed in the treatment plant by the CO₂ of the flue gas in accordance with the following equation:

(1) $CaS_5 + 2CO_2 + 2H_2O = Ca(HCO_3)_2 + 4S + H_2S$ 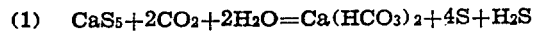

Thus free sulphur is formed according to the above reaction. Being insoluble, this sulphur comes out as a fine precipitate that gives the water a milky color. This is probably the sulphur which gradually accumulates on the hurdles, finally tending to fill up the free space and render the towers ineffective for contact.

Pretreatment of the bleed-water before it goes to the purifying towers by addition of strong SO₂ would decompose the polysulphides in accordance with the following equation:

(2) $CaS_5 + 4SO_2 + 4H_2O = CaS_2O_3 + 3H_2S_2O_3 + H_2S$ 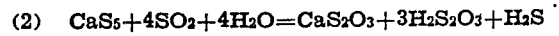

The products are calcium thiosulphate, thiosulphuric acid, and hydrogen sulphide. Unfortunately, thiosulphuric acid is very unstable, and decomposes very rapidly, as follows:

(3) $H_2S_2O_3 = H_2SO_3 + S$ 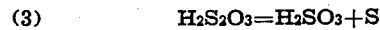

If the reaction is allowed to take place, free sulphur will be formed, and the entire purpose of the SO₂ pretreatment would be defeated, since the pretreatment is specifically designed to prevent free sulphur formation.

We have found, however, that the undesirable secondary reaction (3) can be prevented if the SO₂ treatment be effected as very weak dosage. This we do, in our preferred practice, by adding the SO₂ to the bleed-water as a very dilute solution. If the SO₂ be added by injection directly into the towers, or by having the flue gas carry it, the latter tends to produce the dilution effect. Adding the $SO_2$ as a very dilute solution slows up the speed of the reaction (2), and allows the thiosulphuric acid to be neutralized as fast as it forms. One of the constituents of bleed-water is calcium bicarbonate, $Ca(HCO_3)_2$, which is probably the compound that neutralizes the thiosulphuric acid, as it is formed in reaction (2). The following reaction expresses this neutralization:

(4) $H_2S_2O_3 + Ca(HCO_3)_2 = CaS_2O_3 + 2CO_2 + 2H_2O$

Although thiosulphuric acid is very unstable, the salts of this acid are quite stable and will carry through the purification process with no further change.

Since the pretreatment process is carried out with $SO_2$ in very dilute solution, the intermediate formation of thiosulphuric acid is prevented, so that the $SO_2$ pretreatment may be summed up by adding together equations (2) and (4), thereby eliminating thiosulphuric acid, as follows:

(5) $CaS_5 + 3Ca(HCO_3)_2 + 4SO_2 = 4CaS_2O_3 + H_2S + 6CO_2 + 2H_2O$

This equation represents essentially what probably occurs with the $SO_2$ pretreatment. Whereas $CaS_5$ is unstable and will tend to form free sulphur when treated with flue gas, as in reaction (1), the dilute $SO_2$ pretreatment, as in reaction (5), converts the $CaS_5$ probably to calcium thiosulphate and other stable compounds.

While any soluble sulphite seemed to accomplish the desired result, we find it more economical to set up a sulphur burner, make $SO_2$ and dissolve the $SO_2$ in water.

At present, 1200 lbs. of sulphur are burned per day to furnish 4.2 gr. $SO_2$ per gallon for 4,000,000 gallons of bleed-water. Fresh water to the extent of 120,000 gallons per day is used to carry the $SO_2$, in about .24% solution, into the bleed-water.

At the same time the bleed-water is treated in accordance with the process of the aforesaid Judson, Patent 1,924,861, granted August 29, 1933. This is done by running phosphate solution in through another pipe at the same time that the dilute $SO_2$ solution is added. For the rate of 4,000,000 gallons per day there is used 400 lbs. of superphosphate per day with enough water to dissolve it. Mono-sodium phosphate may be and has been used, but the superphosphate is less expensive. The amount of mono-sodium phosphate equivalent to superphosphate would be about 150 lbs. per day.

For best results the concentration of $SO_2$ in our weak solution should be 0.05 to 0.50% by weight. To obtain such a weak solution, partially treated bleed-water from primary sumps may be used for the diluting. Another factor that aids in the prevention of sulphur precipitation is that of velocity. We have found that best results are obtained when both liquid streams, $SO_2$ and bleed-water, have a fast velocity at the point of introduction of the $SO_2$ water. It is also of advantage to have both streams traveling in the same direction. The quantity of $SO_2$ needed in actual practice may be judged by the degree to which the yellow color has been bleached from the raw bleed-water after treatment with the $SO_2$ reagent. Sufficient $SO_2$ should be added to just remove the yellow mentioned. A certain time interval is needed for this bleaching to take place after the $SO_2$ addition has been made when the $SO_2$ is added by pretreatment rather than by the gas or directly in the treating towers. In our preferred form, this time lag is provided by the introduction of the $SO_2$ water into the bleed-water some 100 to 200 feet before the bleed-water enters the suction of the pump for the primary tower. During this lag period, the bleed-water and $SO_2$ solution are well mixed by means of the baffles in the ditch or flume. Further mixing is imparted by the impeller of the pump as the water passes through the primary pump.

The quantity of $SO_2$, which we have found satisfactory, ranges from 2 to 5 grains per gallon but this quantity may be varied to suit different conditions.

Apparently the amount of $SO_2$ required is independent of sulphide content, temperature, etc., of the bleed-water. Typical figures of $SO_2$ additions for five different months throughout a year show 3.0 to 4.3, 3.8, 4.3, 4.3, 3.7 grains $SO_2$ per gallon of water.

Extra dilution of the dilute $SO_2$ water may be obtained by using bleed-water which has been passed through the towers. We have found improved results obtain when 120,000 gallons $SO_2$ water was further diluted with 60,000 or more gallons per day of the brine from the primary treatment towers.

As a result of experience with different rates of volume of throughput of bleed-water it has been found that the addition of $SO_2$ should be proportional to the bleed-water throughput, so that the quantity of $SO_2$ per gallon of bleed-water is substantially constant. The quality of the bleed-water does not appear to affect the rate of $SO_2$ addition proportionately.

After the bleed-water has been treated with the phosphate solution and the dilute $SO_2$ water as above described, the bleed-water is ready to enter the treating towers. It has a pH of about 7.0, and, after desulphiding and discharge from the plant, it will also be about 7.0. From the inlet ditch or flume the bleed-water containing the phosphate solution and the dilute $SO_2$ water flows into a trench extending past all of the units of treating towers. From this trench it is pumped by the pumps for the primary towers to the top thereof to their spray nozzles from which the water flows directly down on the top of the hurdles. After passing through the primary towers of the respective units, the water is collected in sumps at the base. The water there contains from 1 to 2 grains per gallon of sulphide as compared with, for instance, 12–20 grains on entering. The primary treatment thus secures about 83 per cent purification. From these sumps the water is then pumped to the top of the secondary towers of the respective units through which it passes similarly to its passage through primary towers. The water collects in a sump at the bottom of these secondary towers and such water shows no trace of sulphide, or at most only a trace. From each secondary sump the water flows out through a shallow seal, thence through a flume into a collecting trench from which it discharges into an open ditch leading to tide-water of a river.

*Flue gas flow.*—The flue gas used for purification of the bleed-water is taken from a boiler-house which provides the hot water, steam, and power for all mining operations. The flue gas averages about 8% of $CO_2$ and leaves the boiler stack at about 400° F. By the time the flue gas reaches the bottom of the treating towers, if it undergoes no special intermediate cooling, it is cooled to about 200 to 260 degrees F., depending upon atmospheric conditions. The total amount of flue gas used averages 6 cubic feet (measured at atmospheric pressure at 60° F.) per gallon of raw-bleed-water and good purification is obtained with from 5 to 7 cubic feet per gallon.

At the treating plant, the hot flue gas is branched to enter the bottoms of the several towers so as to flow in parallel through the primary and secondary towers of the respective units. The gas is divided between the primary and secondary and we have found it best to pass 40 per cent through the primary towers and 60 per cent through the secondary towers, or about 2.4 cubic feet per gallon to each primary tower and 3.6 cubic feet to the secondary tower. The pressure of the gas in the towers is about zero, or preferably slightly negative. From the top of the towers the gas flows back to one of the stacks of the boiler house, or to the foul gas stack at the bleed-water plant, for discharge to the atmosphere. By such procedure our process has been found to operate very successfully but we find we may obtain still better results by lowering the temperature of the flue gas entering the treating towers. When the flue gas reaches the bleed-water plant at temperatures ranging from 200 to 260° F., the bleed-water under treatment is heated considerably, especially at the bottoms of the towers where the hot gas first comes in contact with the water. From several standpoints we have found that this may be undesirable and may offset to some extent the phosphate and $SO_2$ treatment. It is known that heat has a tendency to decompose bicarbonates which is what the phosphate treatment is to avoid. Also, heat has a tendency to decompose polysulphides, releasing free sulphur, which the $SO_2$ treatment was designed to eliminate. In cases where the phosphate and $SO_2$ treatment is not entirely complete, the hot flue gas may release free sulphur and also form carbonate.

For these reasons we prefer to pass the flue gas from the boiler-house stack through an economizer where it preheats the boiler feed water and then leaves the economizer at about 140° F., and by the time this gas reaches the treating towers it is at about 2″ of pressure and is cooled to a temperature between substantially 90 to 140 degrees F. and preferably about 100–110° F., as compared with 200–260° F., when it enters the towers at said temperature and reduced by an orifice to about zero pressure. This improvement was found to improve the process and not to require any change in the $SO_2$ treatment due to the change in flue gas temperature.

On different occasions it may be necessary to suspend operation with flue gas and substitute air for the flue gas.

Operation with air instead of flue gas we have found changes the $SO_2$ treatment somewhat, whereas with the flue gas, a single object of the $SO_2$ pretreatment is to prevent deposition of sulphur. With air operation we have found this object is also accomplished but the $SO_2$ should be added to accomplish an additional function. The $SO_2$ must be added so as to also maintain the pH of the water at a sufficiently low point to prevent calcium carbonate precipitation with its consequent scale formation. $Ca(OH)_2$ is formed from $Ca(HS)_2$ when air is used which increases alkalinity and favors formation of polysulphides since oxygen of air tends to form polysulphides in alkaline solutions from hydrosulphides. Thus sufficient $SO_2$ must be added to prevent this formation with air treatment. Correct $SO_2$ treatment is indicated by a water which is white rather than yellow at bottom of the primary tower. Air treatment using $SO_2$ always tends to give a fouled water containing considerable suspended sulphur and hence is not preferred.

The bleed-water contains a fair amount of calcium bicarbonate. As is well known this is relatively soluble, while calcium carbonate is insoluble in water. When flue gas is used as the sweep gas, its $CO_2$ content tends to hold the calcium as bicarbonate and, with the assistance of the added phosphate, calcium carbonate precipitation is avoided. When air is used as a sweep gas it sweeps $CO_2$ as well as $H_2S$ out of the water, the pH goes to 8 or 9, due to $Ca(OH)_2$ formation from $Ca(HS)_2$, and the result may be precipitation of calcium carbonate despite the added phosphate. To correct this, on these occasions of aeration with air, it is necessary to add to the water some acidic substance that will hold the pH of the water low enough so that the phosphate ion may be effective in holding calcium in solution. Sulphur dioxide serves this purpose, and therefore more $SO_2$ is added to the bleed-water than would ordinarily be added for only the polysulphide decomposition.

As examples, in one instance, for this purpose we increased the $SO_2$ from a normal figure of 4.3, to 5.9 grains per gallon. In another instance, when the bleed-water volume was very high, several million gallons per day, it was necessary to close down a bleed well to reduce volume and even then it was necessary to increase the $SO_2$ from a normal of 3.7, to 6.5 grains per gallon.

In general aeration with flue gas is therefore preferred to aeration with air, but the aeration with air is suitable as an alternative process where flue gas is not available or in emergency operations as when the supply of flue gas is temporarily suspended, as for repairs in the flue gas supply means.

The invention is hereinabove set forth as embodied in several particular manners, but it may be variously embodied within the scope of the claims hereinafter made.

We claim:

1. In a process of treating sulphur-mining bleed-water containing calcium bicarbonate which comprises subjecting it to sweeping action of sweep gas in a chamber tower equipped with baffles therefor to sweep out hydrogen sulphide from the water, the improvement comprising reacting on said water with weak soluble sulphite in amount sufficient to prevent deposition of sulphur in the aforesaid tower and on the baffles but insufficient to react with $H_2S$ in the water to form elemental sulphur.

2. In a process of treating sulphur-mining bleed-water containing calcium bicarbonate which comprises subjecting it to sweeping action of flue gas in a tower equipped with baffles therefor to sweep out hydrogen sulphide from the water, the improvement comprising subjecting said water to treatment with dilute $SO_2$ in amount sufficient to prevent the deposition of sulphur in the tower and on baffles but insufficint to react with $H_2S$ in the water to form elemental sulphur.

3. A process of treating sulphur-mining bleed-water containing calcium bicarbonate comprising: subjecting the bleed-water to primary and secondary treatment in towers equipped with baffles in separate primary and secondary stages in which the bleed-water is swept with a flow of sweep gas to sweep out hydrogen sulphide from the bleed-water; adding dilute soluble sulphite solution to the bleed-water, and thoroughly mixing the same at least somewhat in advance of entrance of the mixture into the primary stage in amount sufficient to prevent deposition of sulphur in the towers and on the baffles but insufficient to react with $H_2S$ in the water to form elemental sulphur, adding phosphate solution to the bleed-water at substantially the same time that the soluble sulphite is added; said sweep gas being introduced to the primary stage at a temperature between substantially 90 and 140 degrees Fahr.

4. A process of treating sulphur-mining bleed-water containing calcium bicarbonate comprising: subjecting the bleed-water to primary and secondary treatment in towers equipped with baffles in separate primary and secondary stages in which the bleed-water is swept with a flow of sweep gas to sweep out hydrogen sulphide from the bleed-water; adding dilute soluble sulphite solution to the bleed-water and thoroughly mixing the same substantially in advance of entrance of the mixture into the primary stage in amount sufficient to prevent deposition of sulphur in the towers and on the baffles but insufficient to react with $H_2S$ in the water to form elemental sulphur; said sweep gas being introduced to the primary stage at a temperature between substantially 90 and 140 degrees Fahr.

5. A process of treating sulphur-mining bleed-water containing calcium bicarbonate comprising: subjecting the bleed water to primary and secondary treatment in towers equipped with baffles in separate primary and secondary stages in which the bleed-water is swept with a flow of sweep gas to sweep out hydrogen sulphide from the bleed-water; adding dilute soluble sulphite solution to the bleed-water and thoroughly mixing the same at least somewhat in advance of entrance of the mixture into the primary stage in amount sufficient to prevent deposition of sulphur in the towers and on the baffles but insufficient to react with $H_2S$ in the water to form elemental sulphur.

6. A process of treating sulphur-mining bleed-water containing calcium bicarbonate comprising: subjecting the bleed-water to primary treatment in a tower equipped with baffles in a primary carbonation stage in which the bleed-water is carbonated by flowing flue gas containing carbon dioxide through the water to carbonate nonvolatile sulphides by chemical reaction with the carbon dioxide with release of hydrogen sulphide to volatile form, and thereafter subjecting the bleed-water from the primary stage to secondary treatment in a tower equipped with baffles in a secondary sweep stage in which the bleed-water is swept of residual volatile hydrogen sulphide by flowing flue gas through the water in the secondary stage; adding dilute $SO_2$ water solution to the bleed-water and thoroughly mixing the same substantially in advance of entrance of the mixture into the primary stage, the quantity of $SO_2$ added being sufficient to prevent the deposition of sulphur in the towers and on the baffles but insufficient to react with $H_2S$ in the water to form elemental sulphur.

7. A process as claimed in claim 6 and in which the $SO_2$ is added in quantity ranging from 2 to 5 grains per gallon of bleed-water.

8. A process as claimed in claim 2 and in which the $SO_2$ is in quantity ranging from 2 to 5 grains per gallon of bleed-water.

9. A process as claimed in claim 6 and in which the dilute $SO_2$ water solution and the bleed-water both have a relatively high velocity at the point of introduction of the $SO_2$ water.

10. A process as claimed in claim 6 and in which the mixture undergoes a time lag between the point of introduction of the $SO_2$ water and treatment of the mixture with the flue gas in the primary carbonation stage to provide a time interval for reaction of the $SO_2$.

CARL E. BUTTERWORTH.
JAMES W. SCHWAB.